Jan. 9, 1962 G. F. KEELERIC 3,016,450
WELDING METHOD

Filed Oct. 26, 1959 2 Sheets-Sheet 1

INVENTOR.
George F. Keeleric
BY
Townsend and Townsend
attorneys

Jan. 9, 1962  G. F. KEELERIC  3,016,450
WELDING METHOD

Filed Oct. 26, 1959  2 Sheets-Sheet 2

INVENTOR.
George F. Keeleric
BY
Townsend and Townsend
Attorneys 3,016,450
WELDING METHOD
George F. Keeleric, 6200 Doyle, Emeryville, Calif.
Filed Oct. 26, 1959, Ser. No. 848,693
9 Claims. (Cl. 219—117)

This invention relates to a means for and method of welding metallic members together.

A principal object of this invention is to provide a method of welding which is particularly suitable for welding metal sheets or ribbons together at selected areas.

Another principal object of this invention is to provide a method of welding including the simultaneous application of heat, electrical current flow through the work, pressure exerted against the welding area and a magnetic field surrounding the work.

A feature and advantage of this invention is that the work itself is apparently set up into physical oscillatory or vibratory movement in a manner which assists in the formation of welds.

Another feature and advantage of this invention is that it is believed that the welds created under the influence of a magnetic field having superior properties to welds created in the absence of the field.

A further object of this invention is to provide a method which evidently causes sheet material to vibrate while under pressure by the combination of electrical current passing through the work with the simultaneous application of a magnetic field about or through the work in which either the magnetic field or the electrical current is oscillatory so as to alternate in relative polarity at a predetermined rate.

Still a further object of this invention is to provide a novel method of heating metallic work which is to be welded together by the passage of electrical current through the work.

Other objects of the present invention will become apparent upon reading the following specification and referring to the accompanying drawings in which similar characters of reference represent corresponding parts in each of the several views.

In the principal embodiment of the invention a plurality of relatively high resistance ribbons are placed in stacked relation. It is desirable that the abutting faces of the ribbons be clean to remove any foreign material and to reduce the oxide coating on the material as much as possible. Such high resistance material may include stainless steel and other similar metallic products.

Figure 1:
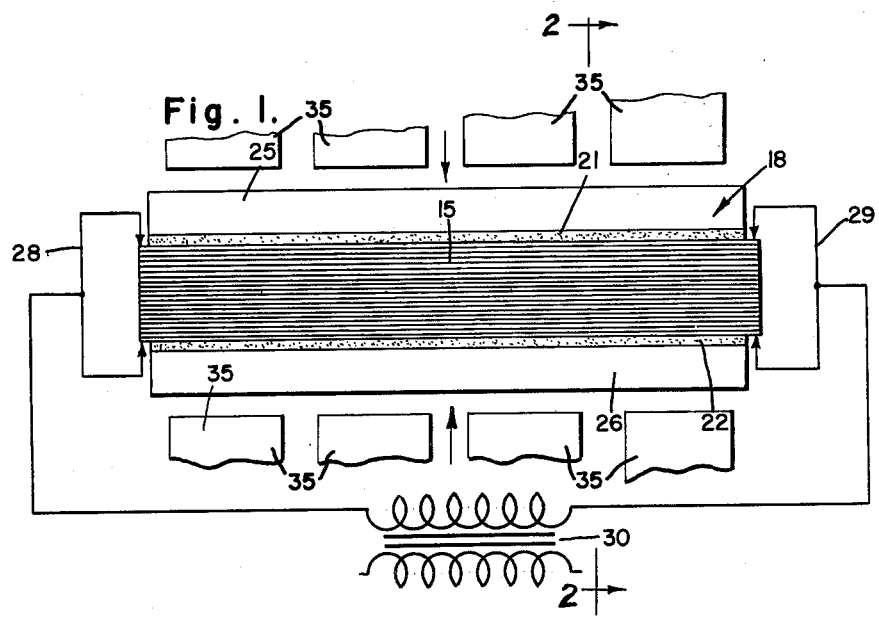
FIG. 1 is a schematic side elevational view of an apparatus for accomplishing the method of this invention.
Figure 2:
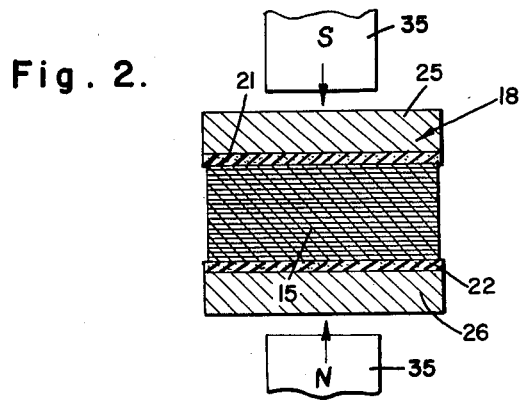
FIG. 2 is a cross-sectional view taken at line 2—2 of FIG. 1.

As seen in FIGS. 1 and 2 the stack of ribbons or foils is indicated at 15 and is placed within a press generally indicated at 18.

An insulating material such as asbestos or mica as indicated at 21 and 22 is placed on the top and bottom faces of the foil to separate the foil electrically from the piston 25 and the platen 26 forming the press.

An electrical current is connected by electrodes 28 and 29 to opposite ends of the foil and current is supplied to the two electrodes through transformer 30.

A magnetic field is created through the work by the provision of electro-magnets 35 placed on one or both sides of foil 15 juxtaposed the top of the press so that the platen 26 and the piston 25 are of opposite polarity. The press in this embodiment is formed of a magnetized material so that the press functions in a sense as an extension of the electro-magnets 35.

In the process of this invention force is applied to the piston to cause the piston to move downwardly against the platen thus pressing the various sheets of foil within foil stack 15 together under considerable pressure. The specific amount of pressure will depend upon the material to be welded and the amount of heat to be generated by the electrical current passing through the foil between electrodes 28 and 29. In this regard a pressure of 500 pounds per square inch has been found satisfactory for creating welds of stainless steel.

With the application of force against the foil electrical current from transformer 30, which is an alternating current say for example 60 cycles, is applied to electrodes 28 and 29. The current passing through the relatively high resistance stainless steel causes the foil to come up in temperature.

Simultaneously with the application of the heating current and force the electro-magnets 35 are energized so as to cause a magnetic field to pass through the foil. It is believed that there is physical vibration set up in the foil due to the action of the magnetic field on the current carrying foil. This magnetic effect is apparent even though the material involved is in itself non-magnetic in that the current through the foil causes sufficient stress to cause some physical movement of the foil strips.

It is desirable to bring the foil to a temperature in which the combined application of pressure, heat and physical movement of the foil will cause the stainless steel foil to be welded together.

After the welds have been completed, foil stack 15 will be a substantially integral body welded together on all faces.

In the fabrication of many types of sheet metal structures, it is desirable to weld one or more metal sheets or ribbons together at selected areas. By using a suitable weld stop-off material, the present invention provides a particularly suitable process for fabricating this latter type of sheet metal product. A highly illustrative example of how the present invention may be so utilized may be described in reference to the fabrication of welded honeycomb material. For example, commercial honeycomb in its expanded form usually comprises many generally corrugated or sinusoidally curved sheets or ribbons of material bonded together node to node to form an open cell honeycomb type structure. Commercial welded honeycomb has to date been formed largely if not exclusively by resistance welding of corrugated sheets one to the other and by passing the current through the nodes from one sheet to the other. As will more fully appear, the present invention may be utilized to produce honeycomb in unexpended pack or block form, which said pack or block may consist of multiple sheets (perhaps 50 to 100 or more sheets) which are diffusion welded together along spaced parallel lines with the welding lines bonding each pair of sheets in the stack staggered in reference to each adjacent pair of sheets in the stack. The unexpanded pack or block may be expanded into an open cell honeycomb structure. All of the welds in the stack are performed in one welding operation, which as indicated by the preceding disclosure, involves the passing of current lengthwise of the ribbons or sheets from one end of the stack to the other, preferably in the presence of a magnetic field having magnetic lines of force cutting across the current flow through the stack.

Figure 3:
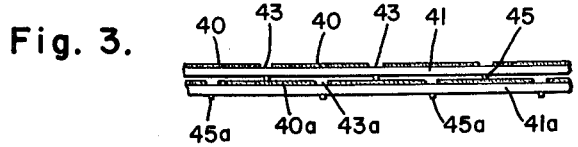
FIG. 3 is a cross-sectional view of metallic strips applied with a stop weld material on the strips so as to isolate the welds to predetermined areas.
Figure 4:
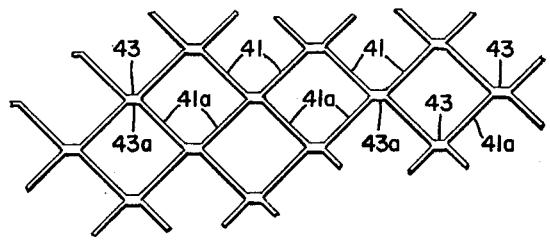
FIG. 4 is a view of honeycomb material which is derived by expanding the welded strips of FIG. 3.

Honeycomb of the type as seen in FIG. 4 may be made by the provision of welding stop-offs (as seen in FIG. 3) between the ribbons. The provision of welding stop-offs is well known in the patent art and may consist of any material which remains relatively inert at welding temperatures and which will not combine with the welding metals. Such materials may consist of a ceramic coating such as aluminum oxide in an ethysilicate binder. The ceramic stop-off is affixed on the top face of each ribbon as indicated at 40 which provides an elongate insulation on the top face of each ribbon 41 covering the entire width of the strip and providing gaps between the insulation indicated at 43 which will form the respective nodes. The underside of the respective nodes 43 is provided with a depending coating 45 of similar material which has been found to cause a buckling or bowing of the stack which will allow greater node to node contact during compression.

Nodes 43 and 43a of each alternate strip 40 and 40a are staggered relative to one another so that nodes 43 are midway between the nodes 43a. A stack of for example 50 to 100 or more of such sheets in the above described stacked relation are then placed in press 18 with the respective insulating members 21 placed on the top and bottom face of the stack. Thereafter force is applied by moving piston 25 against platen 26. Heat is generated in the foil by the application of current through electrodes 28 and 29 which are attached to opposite ends of the stack 15. At the same time the magnetic force created by electro-magnets 35 is energized so as to cause a continuous magnetic field through the work. The material is then removed from the press and pulled apart to form the honeycomb structure as seen in FIG. 4.

As a variation of this process the current flowing between electrodes 28 and 29 could be direct current and the magnetic field created by electro-magnets 35 could be an alternating field oscillating in its polarity at periodic intervals. The cyclic time of the relative change of either the magnetic field or the current flowing through the foil has been satisfactorily applied at 60 cycles but it is believed that the frequency can vary from a low of a few cycles up to supersonic ranges.

Figure 5:
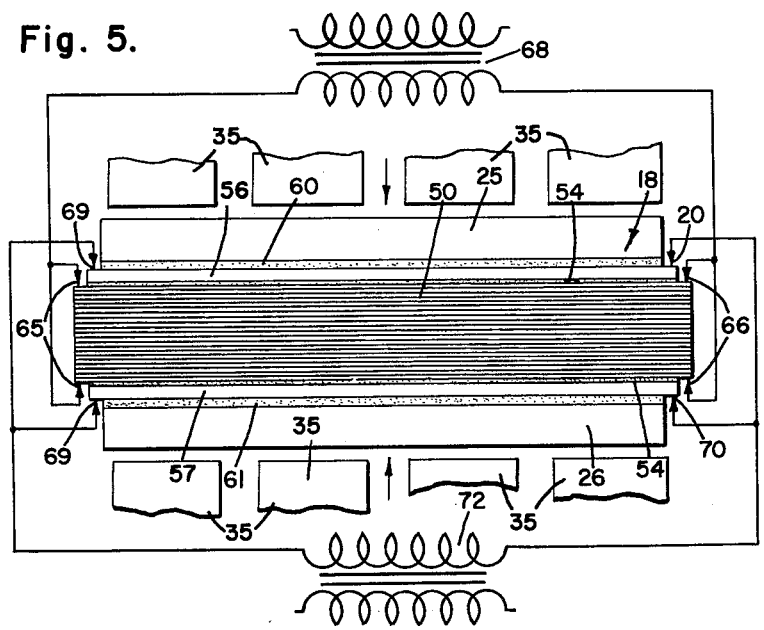
FIG. 5 is a side elevational view of another embodiment of the invention incorporating a mechanism for welding low resistance material such as aluminum.
Figure 6:
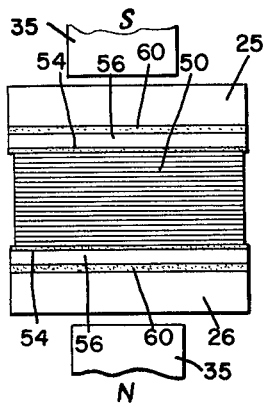
FIG. 6 is a cross-sectional view of the embodiment of FIG. 5.

When metals of substantially low resistance such as aluminum are desired to be welded it is difficult to pass a current through such metals in order to bring the metal up to welding temperature due to the fact that the metal has a resistance which is close to the resistance of the conductors carrying the current to the stack of ribbons or material to be welded. In such case the modification as shown in FIGS. 5 and 6 may be employed.

In this embodiment a stack of aluminum foil indicated at 50 is placed between platen 26 and piston 25 in the manner as described above in relation to the stainless steel or high resistance material.

Welding stop-off can be employed between the sheets or strips in a manner similar to that shown in FIG. 3 so as to obtain honeycomb as shown in FIG. 4 or to obtain grill products of the type which are formed by having the ribbons only welded together at selected areas.

In the case of low resistance material, however, the outer faces of the material are coated with a thin mica insulator 54. Thereafter stainless steel or other relatively high resistance plates 56 and 57 are placed on opposite sides of stack 50 against the mica so as to be completely electrically insulated from stack 50 but yet in intimate physical contact separated only by the dielectric film.

Second insulating layers 60 and 61 are interposed between piston 25 and platen 26 respectively so as to electrically insulate high resistance plates 56 and 57 from press 18.

In this device electrical current is connected by electrodes 65 and 66 to opposite ends of the aluminum or other low resistance ribbons. The electrodes are connected to a transformer 68 by which current can be fed through aluminum stack 50.

A second set of electrodes 69 and 70 are connected to the opposite ends respectively of the two high resistance plates 56 and 57. Current is supplied from a separate source 72 to the two electrodes 69 and 70 respectively.

A magnetic field is created through the work by electro-magnets 35 in the same manner as taught in reference to FIGS. 1 and 2.

The electrical power through high resistance plates 56 and 57 causes the plates to heat to sufficient temperature to bring the aluminum or other low resistance material to welding temperature. The separate electrical circuit through the stack of strips 50 causes an alternating current stress in the strips which when acted upon by the magnetic field created by electromagnets 35 creates a physical vibration or movement of the respective strips during the welding operation. The press, of course, operates during this period to provide the requistite physical force to compress the strips of material together.

One of the important features of the invention is that the magnetic flux through the welding nodes during the welding operation creates an area of specific polarization during the welding. It is believed that such a polarized condition will create a superior weld.

It is also believed that the combination of providing either an alternating current through the work and a fixed magnetic field or the provision of an alternating magnetic field and a direct current through the work creates a vibratory effect which assists in the formation of welds in the respective nodes. This effect is assisted by the temperature increase due to the passage of electrical current through the work and in the case of the embodiment of FIGS. 4 and 5 through the plates on opposite sides of the work.

The welds in this invention are thus created by the combination of forces including pressure, heat and vibration, the vibration being accomplished solely by the combination of an external magnetic force and current flow through the work.

Although the invention has been described primarily in the description of forming a plurality of parallel sheets of material together it is believed obvious that the sheets need not be in strictly parallel condition. The only requirement being that the metallic material to be welded is provided with areas which are in physical contact under conditions in which electrical current is arranged to pass through the material and need not pass through the areas, in order to effectively heat the material. The provision of the magnetic field therein adds the additional feature of creating the vibratory action as either the magnetic field or the current through the work is oscillating or alternating. It has been found, for example, that the core material can be welded to the skin material between which the core is sandwiched by placing the core material with skins applied in the press and by running the current through the work under the conditions as set forth in the preceding examples.

Although the part of the foregoing disclosure has been described in particular reference to the manufacture of metallic honeycomb, it is appreciated that the scope of the invention, in its broader concepts, is not limited to the manufacture of honeycomb per se. In this connection, it is contemplated that the invention will have utility in the fabrication of numerous other types of sheet metal products, such as radiator cores, conduits fabricated from sheet metal, gratings, and numerous other items which may be formed by the welding of two or more metallic sheets together.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A method of welding metallic elements together having the steps of: establishing at least one point of metal to metal contact between said elements; heating said elements to an elevated temperature; and subjecting said elements to a magnetic field from a point remote from the elements of substantially greater magnitude than the earth's magnetic field and whereby the molecules of the metallic elements at their points of contact at elevated temperature are excited sufficiently to cause a welding to occur between said elements.

2. The method according to claim 1 and wherein said elements are elevated in temperature by passing an electrical current through said elements.

3. The method according to claim 2 and wherein said elements are elevated in temperature by the combination of heat generated by current passing through said elements and supplementary heat applied thereto in addition to the heat generated by the current passing through the elements.

4. The method according to claim 2 and wherein said electrical current passing through said elements is alternating current.

5. The method according to claim 4 and wherein the magnetic field remote from the elements is arranged to direct the magnetic line of flux through the elements at an angle normal to the direction of current flow through the elements.

6. A method of welding electrically conductive metallic elements together having the steps of: placing said elements in stacked position; conditioning the abutting surfaces of said elements to provide at least one point of metal to metal contact between said elements; connecting an electrical current to opposite ends of said elements of sufficient intensity to heat said elements; thence heating said elements to sufficient temperature to raise the temperature of the elements to welding temperature; and simultaneously subjecting said elements to a supplementary magnetic field passing transversely through said elements of substantially greater magnitude than the earth's magnetic field.

7. A method of welding conductive metallic members together to form an integrated product having the steps of: stacking a plurality of said members in face to face relation; contacting the members together in metal to metal contact at some areas and not in others; applying force to tightly compress said members together; heating said members by passing an electrical current through said members, raising the temperature of said members to a point sufficient to allow welding the members at the point of metal to metal contact while simultaneously subjecting said members to a supplementary magnetic field in addition to the earth's magnetic field and the inherent magnetic field created by the current passing through said members, and creating a fluctuation of the relative magnitude between the current intensity through the members and the supplementary magnetic field.

8. A method of welding metallic members together comprising the steps of: heating said metallic members to an elevated temperature to create a weld between members, and subjecting said members to a magnetic field during the welding period; said magnetic field being of greater magnitude than the earth's magnetic field at the point of welds and oriented to pass directly through the metallic members.

9. A method of welding honeycomb core having the steps of: defining a plurality of spaced parallel nodes on at least one of a plurality of electrically conductive metallic steps; insulating the spaces between adjacent nodes of each strip; stacking the strips so that the exposed surfaces of each node contact exposed strip material on the superposed strip; passing electrical current from one end of said strip to the other; subjecting the stacked strips to pressure; and passing a magnetic field through said strips; one of said electrical currents and said magnetic field being arranged to fluctuate in intensity to provide a varying physical stress between strips, the heat and pressure being of sufficient intensities to weld the node surfaces of superposed strips together.

References Cited in the file of this patent

UNITED STATES PATENTS

| | | |
|---|---|---|
| 853,351 | Fulton | May 14, 1907 |
| 904,882 | Lachman | Nov. 24, 1908 |
| 1,259,271 | Murray | Mar. 12, 1918 |
| 2,222,906 | Hentzen | Nov. 26, 1940 |
| 2,882,384 | Foster | Apr. 14, 1959 |